United States Patent [19]

Charamella et al.

[11] 4,046,476
[45] Sept. 6, 1977

[54] COLOR DESIGN METHOD

[75] Inventors: John Barrie Charamella, Port Washington, N.Y.; John Warren Long, Freehold, N.J.; Jerry Lloyd Stone, Boothwyn, Pa.

[73] Assignee: E. I. Du Pont de Nemours and Company, Wilmington, Del.

[21] Appl. No.: 645,215

[22] Filed: Dec. 29, 1975

[51] Int. Cl.² .................. G03B 27/32; G03G 5/12; G03G 13/01
[52] U.S. Cl. ........................... 355/77; 96/1.2
[58] Field of Search .......... 355/4, 77, 32, 35, 88; 96/1.2

[56] References Cited
U.S. PATENT DOCUMENTS

| | | | |
|---|---|---|---|
| 3,117,488 | 1/1964 | Giordano | 355/4 X |
| 3,148,600 | 9/1964 | Bain | 355/4 |
| 3,825,337 | 7/1974 | Lucas | 355/4 |
| 3,901,592 | 8/1975 | Nepper | 355/4 |

*Primary Examiner*—Richard A. Wintercorn

[57] ABSTRACT

A method of color design is provided in which multi-color, fast copies of a multi-color optical image, in a multiplicity of color design combinations are obtained. These fast copies enable a designer to quickly possess proofs of his design in various color combinations. The method comprises:
 a. independently changing and viewing the colors of individual components of a color variable image until a desired color combination of the image is obtained;
 b. projecting the colored image from (a) onto the input of a multi-color reproduction copier;
 c. making a copy of the image in a visual match of the colors projected; and
 d. repeating steps (a), (b), and (c) any desired number of times to obtain fast copies of the image in a multiplicity of color combinations.

10 Claims, 4 Drawing Figures

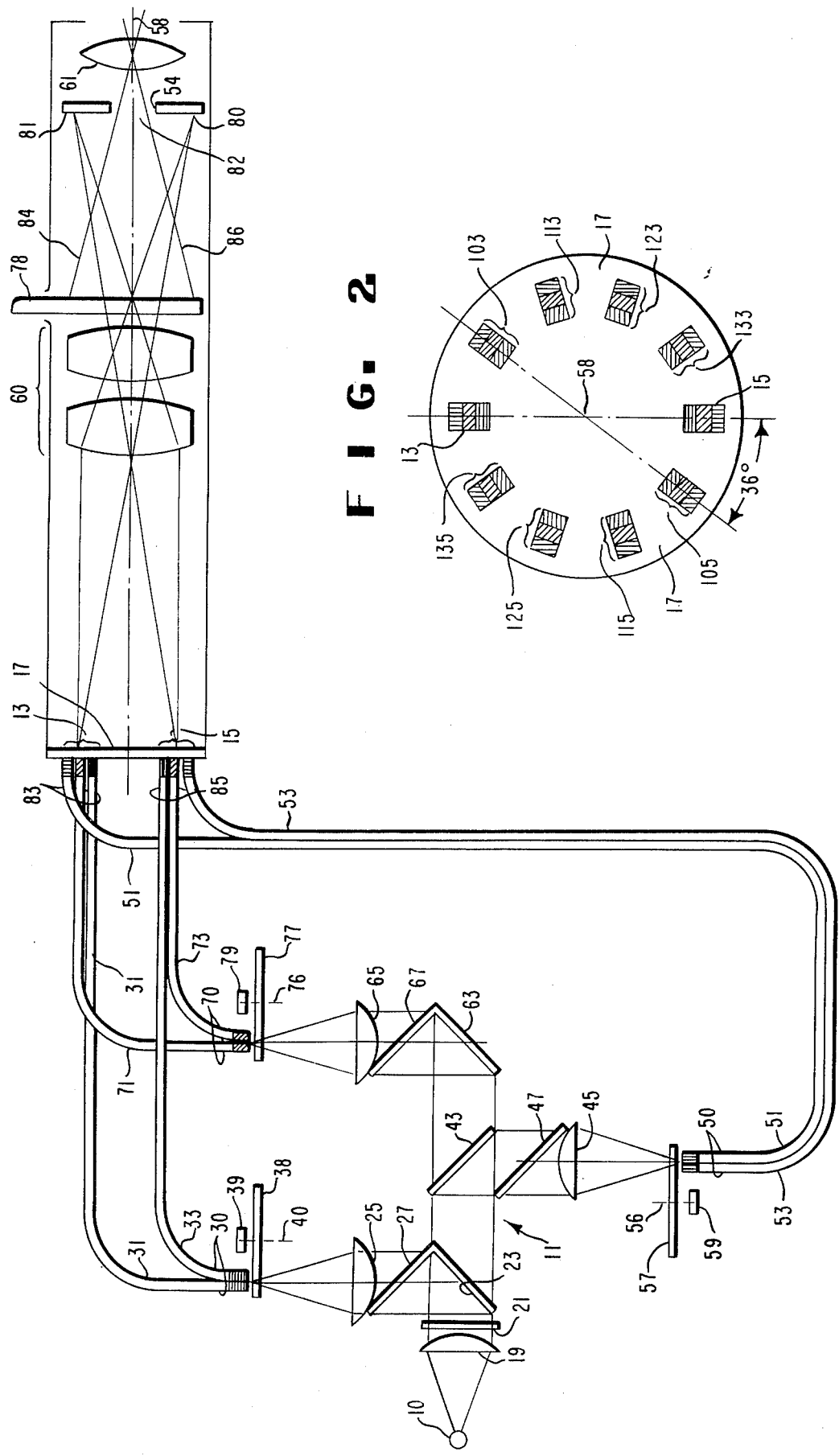
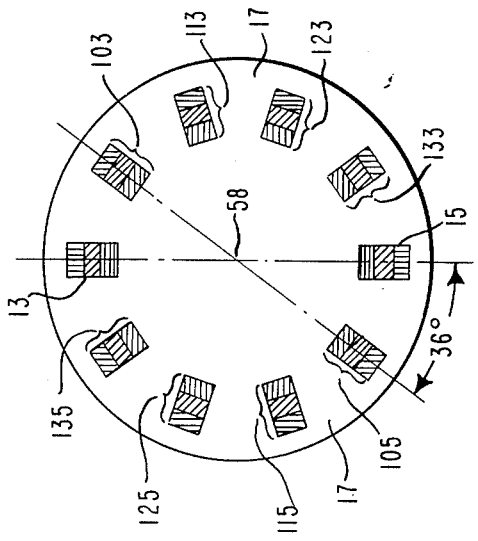

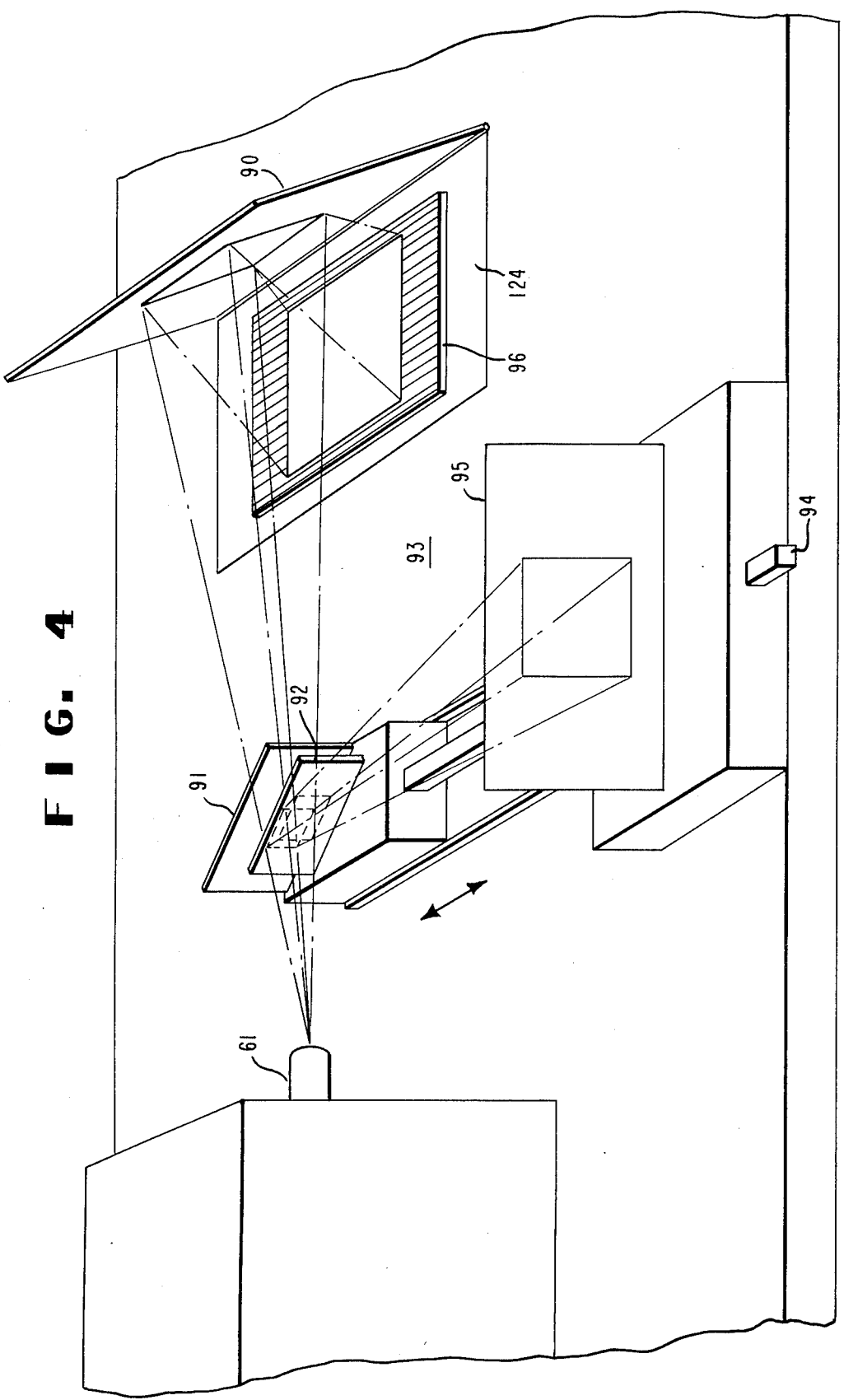

COLOR DESIGN METHOD

BACKGROUND OF THE INVENTION

1. Field of the Invention

This invention relates to color design creation methods and more particularly to such methods in which fast color copies are produced.

2. Prior Art

The development of color designs for such goods as textile fabrics, wallpaper, carpeting, floor and ceiling tiles and the like takes time and can be expensive. A typical styling procedure used in the fabric industry is as follows:

1. Purchase the original artwork for a proposed design creation which is then submitted to an engraver;
2. create colorways for the design which are then submitted to a printer;
3. print cloth samples using the design of various colorways; and
4. show the cloth samples to customers.

Traditionally, the color styling done in (2) above is accomplished by the designer interacting with an artist wherein the designer chooses colors felt to represent the "color look" for the season and communicates them to the artist who then paints a small sample of each colorway. The designer reviews the samples with the artist and makes final adjustments. After the artist paints the final colorways, as many as 5-10 reproductions of each colorway may be painted for internal use and use by salesmen.

As can be seen, time and expense are tied up in the artist who is simply reproducing new colors in a design. Also, the designer is limited in the number of colorways produced because of the time needed to paint samples. The number of multiple copies is limited by the size of the art staff available.

Recently, a designer has been aided in the selection of colorways by an optical image reconstruction apparatus such as described in U.S. Pat. Nos. 3,549,238 and 3,561,859. In using such an apparatus, the original design creation is separated into individual color channels which are made into a special gradient slide. The silde is placed in the apparatus and the designer can change each color in the design while holding other colors constant. After a desired colorway is set, the designer matches the colors, as near as possible, to colors from a color library. Hard copies of the desired colorway are made by printing procedures using the colors selected from the color library.

While the image reconstruction apparatus expands the designers' ability to set colorways, the system has certain limitations. First of all, the color library usually does not have a complete range of colors infinitely variable through the complete spectrum. Second, copy production, which is the creation of colorways, is done at the printer. Thus, while designer-artist interaction is still needed during creation of the colorways, it has been removed. Third, the designer must wait to receive the hard copies before a final decision on colorways can be made. Thus, there remains a need for a color design system which can color-style and produce design creations quickly and cheaply.

BRIEF DESCRIPTION OF THE DRAWINGS

FIG. 1 is a schematic illustration of an optical, image reconstruction apparatus useful in the present method;

FIG. 2 is a plan view of the light sources in the optical apparatus;

FIG. 4 is a schematic perspective view of an optical system useful in the present method for previewing a color style of an image of a design prior to making a hard copy.

SUMMARY OF THE INVENTION

Figure 3:
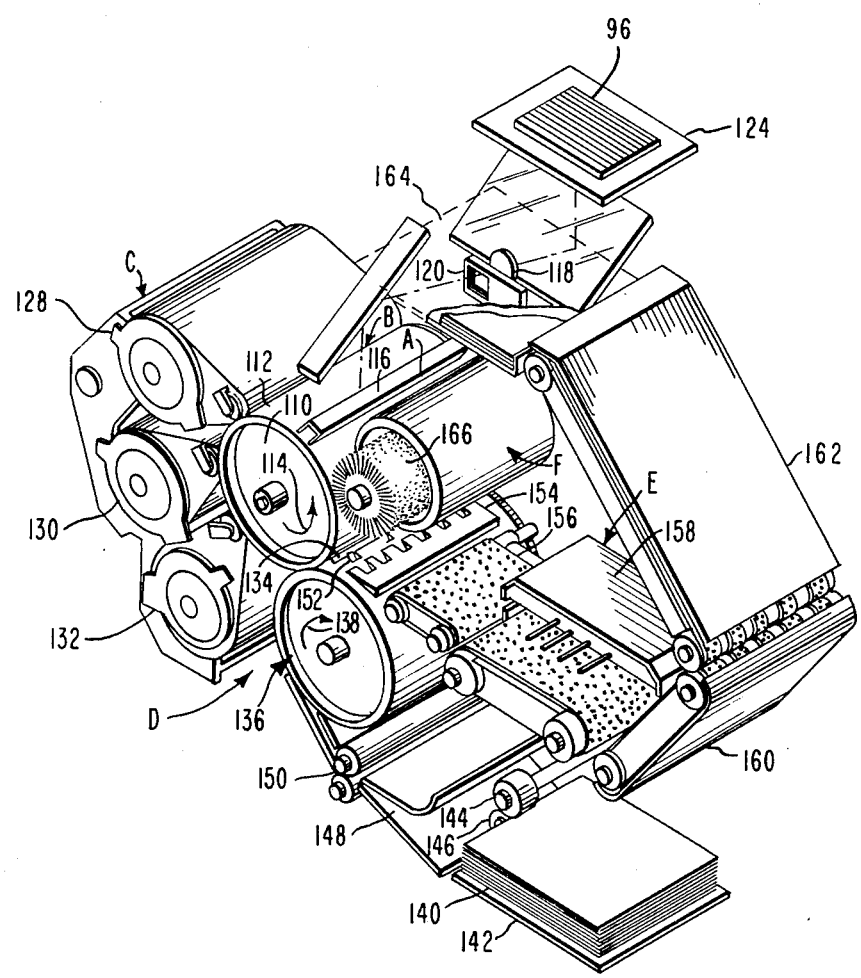
FIG. 3 is a schematic perspective view of a multicolor electrophotographic color copier useful in the present method.

According to the present invention there is provided a continuous, on-line method of obtaining color copies of a color variable image comprising:

a. independently changing and viewing the colors of individual components of a color variable image until a desired color combination of the image is obtained;
b. projecting the colored image from (a) onto the input of a multi-color reproduction copier;
c. making a copy of the image in a visual match of the colors projected; and
d. repeating steps (a), (b) and (c) any desired number of times to obtain fast copies of the image in a multiplicity of color combinations.

DETAILED DESCRIPTION OF THE INVENTION

A continuous, on-line method has been found for color-styling a design creation and making hard copies in the designers' studio which enables the designer to make a final decision on colorways (various color combinations of the design). The method is fast, inexpensive compared to the traditional method and eliminates the need of an artist. The drawings illustrate one way of practicing the method of the invention.

In FIG. 1, a single optical subassembly 11 provides a source of red, green and blue light components to a pair of diametrically-opposed off-axis light sources 13 and 15, respectively, located in a transform filter 17 of a reconstruction apparatus of the kind described in the aforementioned patents. The optical axis of the reconstruction apparatus is along line 58—58. White light from the principal light source, lamp 10, passes through a first condenser lens 19 and a heat filter 21 to a first spectral filter 23 (preferably dichroic) which reflects blue light to a second condenser lens 25 through a blue trim filter 27. The first and second condenser lenses 19 and 25 form a first condenser system for focusing the blue light component on a first bundle 30 of two light conductors 31 and 33 through a circular variable neutral-density wedge in the form of disc 38 that is rotatable on a shaft 40 by means of a motor 39. The wedge 38 has a density which varies with angular displacement around the shaft 40, the functional relationship between density and angular position being a matter of choice for the designer of particular apparatus. The two light conductors 31 and 33 may be grouped side-by-side as shown, or may be random-mixed at the bundle 30.

Light that passes through the first spectral filter 23 next encounters a second spectral filter 43 which reflects red light to a third condenser lens 45 through a red trim filter 47. The first and third condenser lenses 19 and 45 form a second condenser system for focusing the red light component on a second bundle 50 of two light conductors 51 and 53 through a second circular neutral-density wedge in the form of a disc 57 which is rotatable on a shaft 56 by means of a motor 59.

Light that passes through the second spectral filter 43 next encounters a mirror, preferably incorporating a third spectral filter 63, which reflects green light to a fourth condenser lens 65 through a green trim filter 67. The first and fourth condenser lenses 19 and 65 form a third condenser system for focusing the green light component on a third bundle 70 of two light conductors 71 and 73 through a third circular neutral-density wedge in the form of a disc 77 which is rotatable on a shaft 76 by means of a motor 79. The second and third bundles 50 and 70 can also be made of side-by-side or random-mixed groupings of fibers.

A first blue light conductor 31, a first green light conductor 71 and a first red light conductor 51 are brought together in a first trifurcated bundle 83 to form a first one 13 of the pair of off-axis light sources 13, 15. A second blue light conductor 33, and a second green light conductor 73 and a second red light conductor 53 are brought together in a second trifurcated bundle 85 to form the second one 15 of these two off-axis light sources.

Each off-axis light source 13, 15 in the illustrated diametrically-opposed pair is located in the transform filter assembly 17 so as to deposit a first-order (or other desired-order) diffraction spectrum in the aperture stop 54 of the reconstruction apparatus when used to demodulate a modulated image stored in a suitable record 78, provided the record contains modulation which bears the proper azimuthal orientation for both sources and has appropriate spatial periodicity. The reconstruction apparatus includes as components known from the aforesaid patents a transform lens assembly 60, a projection lens 61 and the aperture stop 54. The record 78 bearing a spatially-modulated stored image may be located on the far side of the transform lens from the transform filter. It is assumed for the purposes of this illustration (i.e.: in FIG. 1) that the record 78 bears a diffraction grating modulation the lines of which are directed normal to the drawing. With this arrangement, as is known, zero-order diffracted light from each light source 13, 15 will be directed to fall outside the aperture of the stop 54, for example at a position 80, 81, respectively, and a first-order diffraction pattern from each source 13, 15 will fall in the stop 54 at a region 82 as is represented by lines 84, 86.

Using the arrangement shown in FIG. 1, several optical subassemblies, for example, five like the one shown, can be arrayed around the lamp 10, to provide four additional pairs of diametrically-opposed off-axis light sources 103, 105; 113, 115; 123, 125; and 133, 135; arrayed around the optical axis 58 in the transform filter assembly 17, as is shown in FIG. 2. Each such pair will constitute the input light to a separate optical channel, and can be used to illuminate a uniquely spatially-modulated record image; and each uniquely-modulated image can be illuminated and reconstructed separately from or simultaneously with one or more of the others. Each such light source can be spaced azimuthally the same amount from its neighbors, in which case the angle between adjacent pairs of light sources will be 36°, in the illustrated example. Advantageously, each light source in the transform filter 17 for the reconstruction system is comprised of a radially-distributed array of colored light sources. An array of three colored sources — red, green and blue, with the red located radially furthest from the optical axis 58 and the blue nearest to the axis — is a preferred example. This array is fixed relative to the optical axis, each color being uniquely located as determined by the diffraction grating spatial periodicity in the record 78 and optical parameters of the reconstruction apparatus. The input ends of a trifurcated bundle of light conductors (e.g.: 83, 85) which receive the individually colored light inputs are physically separate from each other, so that each may be coupled to a separate source of spectrally-filtered light, as appears in FIG. 1. Using this technique, a plurality of off-axis light sources can be provided, each of which can be made to provide light of any desired hue or color at an optimum radial distance from the optical axis 58, 58 of the modulated-image reconstruction system employing them. Neutral density variable-density light filters (e.g.: 38, 57, 77) are employed to attenuate to any desired degree the light of any one or more spectral components of each individual off-axis light source.

The color image projected by lens 61 is directed by appropriate mirrors to the input of a multi-color copier such as the color electrophotographic copier illustrated in FIG. 3. This illustrated copier employs a drum 110 mounted rotatably within a machine frame (not shown). Drum 110 has entrained about the exterior circumferential surface thereof photoconductive surface 112, which is secured thereto. A suitable photoconductive material is disclosed in U.S. Pat. No. 3,655,377 issued to Sechak in 1972. Drum 110 is rotated in the direction of arrow 114 by a drive motor (not shown) within the copier. In this way photoconductive surface 112 passes sequentially through a series of processing stations. Drum 110 rotates at a substantially constant speed and includes a timing disc mounted on one end region thereof for triggering the machine logic to thereby coordinate the sequence of events at the various processing stations therewith.

First, drum 110 rotates photoconductive surface 112 through charging station A. A corona generating device, indicated generally at 116, is positioned at charging station A. Corona generating device 116 extends in a longitudinal direction transversely across photoconductive surface 112 and generates a spray of ions. The spray of ions from corona generating device 116 charge photoconductive surface 112 to a relatively high substantially uniform potential. Preferably, corona generating device 116 is of the type described in U.S. Pat. No. 2,778,946 issued to Mayo in 1957.

After photoconductive surface 112 is charged to a substantially uniform potential, drum 110 rotates to exposure station B. At exposure station B, a color filtered light image of the design creation is projected onto charged photoconductive surface 112. Exposure station B includes thereat a moving lens system, generally designated by the reference number 118, and a color filter mechanism, shown generally at 120. As shown in FIG. 3, the design creation is projected through a cylindrical Fresnel lens 96 upon transparent platen 124. Fresnel lens 96 forms a line image of the projection lens 61 parallel to the scanning path of the aperature of the copier lens 118. Lens system 118 is moved in a timed relation with drum 110 to scan successive incremental areas of the line image. In this manner, a flowing light image of the design creation is created and projected onto photoconductive surface 112. The irradiated areas of photoconductive surface 112 are discharged to form an electrostatic latent image thereon corresponding to the projected design creation. Color filter mechanism 120 is adapted to interpose selected color filters into the optical light path. The appropriate color filter attenuates the light rays passing through lens 118 to record an electrostatic latent image on photoconductive surface 112 corresponding to a preselected spectral region of the electromagnetic wave spectrum, hereinafter referred to as a single color electrostatic latent image. A suitable moving lens system is disclosed in U.S. Pat. No. 3,062,108 issued to Mayo in 1962. The color filter mechanism should be compatible with the filter systems of the image reconstruction device shown in FIG. 1.

Drum 110 next rotates the single color electrostatic latent image recorded on photoconductive surface 112 to development station C. At development station C, three individual developer units, generally indicated by the reference numerals 128, 130, and 132, respectively, are positioned adjacent drum 110. A suitable development station of the type illustrated in FIG. 3, is disclosed in U.S. Pat. No. 3,845,449 issued to Davidson in 1974. The individual developer units of the development system are all of the type referred to generally as magnetic brush developer units. A typical magnetic brush developer unit utilizes a magnetizable developer mix having carrier granules and toner particles therein. The developer mix is continually brought through a directional flux field to form a brush thereof. The electrostatic latent image recorded on photoconductive surface 112 is developed by bringing the brush of developer mix into contact therewith. Toner particles are attracted from the brush of developer mix to the electrostatic latent image recorded on photoconductive surface 112 forming a powder image thereon. Each of the respective developer units contains discretely colored tone particles corresponding to the complement of the spectral region of the wave length of light transmitted through filter 120. For example, a green filtered electrostatic latent image is rendered visible by depositing greeen absorbing magneta toner particles on the electrostatic latent image recorded on photoconductive surface 112. Blue and red latent images are developed with yellow and cyan toner particles, respectively.

After the single color electrostatic latent image recorded on photoconductive surface 112 is developed with suitably colored toner particles, drum 110 rotates to transfer station D. At transfer station D, the toner powder image adhering to photoconductive surface 112 is transferred to a sheet of final support material 134. Support material 134 may be, amongst others, plain paper or a sheet of thermoplastic material. The transfer roll, shown generally at 136, is arranged to have support material 134 secured releasably thereto and recirculates therewith. Transfer roll 136 rotates in the direction of arrow 138 at substantially the same angular velocity as drum 110. In this manner, successive single color toner powder images may be transferred from photoconductive surface 112 to support material 134. Transfer roll 136 is biased electrically to a potential of sufficient magnitude and polarity to attract electrostatically the toner powder image from photoconductive surface 112 to support material 134. A suitably electrically biased transfer roll 136 is described in U.S. Pat. No. 3,612,677 issued to Langdon et al. in 1971.

Support material 134 is advanced from a stack 140 thereof disposed on a tray 142. Feed roll 144, operatively associated with retard roll 146 advances and separates the uppermost sheet from stack 140 disposed on tray 142. The advancing uppermost sheet moves into chute 148 which directs it into the nip between register rolls 150. Register rolls 150 align the sheet, and advance it to transfer roll 136. Gripper fingers 152 secure releasably support material to transfer roll 136. After a plurality of toner powder images have been transferred to support material 134 (in this case, 3), gripper fingers 152 space support material 134 from transfer roll 136. This enables stripper bar 154 to be interposed therebetween separating support material 134 from transfer roll 136.

After support material 134 is separated from transfer roll 136, it is advanced on endless belt conveyor 156 to fixing station E. At fixing station E, a fuser, indicated generally at 158 permanently affixes the multi-layered toner powder image to support material 134. One type of suitable fuser is described in U.S. Pat. No. 3,498,592 issued to Moser et al. in 1970. After the fixing process, support material 134 is advanced by endless belt conveyors 160 and 162 to catch tray 164. Catch tray 164 is arranged so that the machine operator may readily remove the completed multi-color copy therefrom.

After the toner powder images have been transferred from the electrostatic latent image recorded on photoconductive surface 112 to support material 134, some toner particles may remain on photoconductive surface 112. These residual toner particles are removed from photoconductive surface 112 as it passes through cleaning station F. Initially, the toner particles are brought under the influence of a cleaning corona generating device (not shown) arranged to neutralize the electrostatic charge remaining on the toner particles. The neutralized toner particles are then mechanically cleaned from photoconductive surface 112 by a rotatably mounted fibrous brush 166 in contact therewith. A suitable brush cleaning device is described in U.S. Pat. No. 3,590,412 issued to Gerbasi in 1971. As shown in FIG. 3, rotatably mounted brush 166 is in contact with photoconductive surface 112 and mechanically removes the residual toner particles remaining thereon. Thus, photoconductive surface 112 has the residual toner particles cleaned therefrom prior to repeating the foregoing print cycle for the next successive toner powder image.

As shown in FIG. 4, the color image projected by lens 61 is directed through cylindrical Fresnel lens 96 upon transparent platen 124 of the copier by a mirror 90. Deflection mirror 91 and color filter pack 92 are mounted slideably (in the directions of the arrrow) on base support 93. When deflection mirror 91 is pulled toward the front by lever 94, the color image is projected onto viewing screen 95 enabling the designer to preview the colorway to be copied by the multi-color, fast copier. It is important to the present method that the designer copy the viewed image. If the spectral transmission characteristics of the apparatus used to project the color image are essentially the same as the spectral absorption characteristics of color filter 120 in the multi-color copier, no adjustments should be needed and the projected image previewed on screen 95 will visually match (i.e., look essentially the same to the human eye) the color copy. However, if the spectral characteristics vary, color filter pack 92 is used to change the colors of the image viewed on screen 95 so that it is a visual match with the copy produced by the copier. Color filters can also be placed in the projected light path between lens 61 and Fresnel lens 96 to achieve a visual color match between the previewed image and hard copy. When the designer sees a color combination he likes, the deflection mirror and filter pack are pushed back to record the projected image on transparent platen 124. Alternatively, the projected image can be previewed on the platen itself by inserting a reflective surface such as a sheet of white paper on top of the Fresnel lens.

While it is preferred to carry out the color design method using the apparatus described above and shown and illustrated in FIGS. 1–4, other methods of previewing and methods of copying colored images can be used. For example, original artwork can be color separated using a scanner which electronically separates colors into individual storage channels according to lightness values. The color separations are displayed on a color cathode ray tube (CRT). Individual color channels can be varied independently in the multi-colored image displayed on the CRT. An example of this system is the Model 904 Graphicolor made by Spatial Data Systems, Inc. The light output of this systems is projected into a color copier.

Multiple projection systems which can project a color variable, multi-color image can be used. Examples are Teijin's Color Simulator and the ICI Quadramix Color Simulator. In these systems, each lens with a separate color control system projects one color separation of the design. A multi-facet field lens geometrically placed in the light paths of the multiple projection lens optically collects the separate images and converges them into a single image of the multi-color design. This single image is then previewed on a screen and projected into a color copier.

Fast, multi-color, visually matched copies of the design are preferably made on a Xerox Color Copier such as illustrated and described herein. Other systems which can be used in the present method include the 3M Color-in-Color apparatus which is believed to be described in U.S. Pats. Nos. 3,601,484 and 3,901,592. The projected image can also be copied quickly by imaging Polaroid color film directly from the viewing screen or by projecting the image directly into a copy camera in which the design is developed on Ciba Chrome positive to positive printing material. An example of this system is Pos Color made by Visual Graphics Corp.

The color design method of the present invention has the advantages of allowing the designer to operate the process in house, totally control color in each individual component of the design over a broad color range, and obtain inexpensive hard copy immediately in quantity.

The present color design method is useful in selecting color patterns for fabrics, dry goods, heat transfer papers, wall papers, carpets and rugs, floor and ceiling tiles, curtains and draperies, house furnishings, ceramic tiles, vitreous china, earthen ware, table and kitchen articles, advertising agencies, packaging, communications, graphics, commercial photography, art and the like.

What is claimed is:

1. An on-line method of obtaining color copies of a color variable image comprising;
    a. independently changing and viewing the colors of individual components of a color variable image until a desired color combination of the image is obtained;
    b. projecting the colored image from (a) onto the input of an electrophotographic fast multi-color reproduction copier;
    c. making a copy of the image in a visual match of the colors projected; and
    d. repeating steps (a), (b) and (c) any desired number of times to obtain fast copies of the image in a multiplicity of color combinations.

2. The method of claim 1 wherein the viewing of the changing of the colors in the image and the projecting of the image simultaneously occurs.

3. The method of claim 1 wherein a multiplicity of fast copies of any given, desired image are obtained.

4. The method of claim 1 wherein the electrophotographic fast copier is a xerographic color copier.

5. The method of claim 1 wherein the colors of the colr variable image are independently variable over a complete color range.

6. The method of claim 1 wherein the color variable image is formed by passing light from a multiplicity of variable color light sources through a multiplicity of masks defining separate zones of a design.

7. The method of claim 1 wherein the color variable image is formed by passing light from a multiplicity of variable color light sources through a single mask having separate zones forming a design, each variable color light source creating the color for a separate zone of the design.

8. The method of claim 1 wherein the color variable image is formed by electronically separating the colors of an original design into individual color channels according to lightness values and displaying the color separations on a color cathode ray tube.

9. An on-line method of color design and obtaining copies of the color design in a multiplicity of color combinations comprising;
    a. projecting a multi-colored image of a design onto the input of a multi-color reproduction copier capable of producing a color copy of the multi-colored image;
    b. making a copy of the image in a visual match of the colors projected;
    c. independently changing the colors of individual components of the image unitl a new desired color combination of the design is obtained;
    d. projecting the image in the new color combination onto the input of the multi-color reproduction copier;
    e. making a copy of the image in a visual match of the new color combination projected; and
    f. repeating steps (c), (d) and (e) any desired number of times to obtain copies of the design in a multiplicity of color combinations.

10. The method of claim 9 wherein the electrophotographic fast copier is a xerographic color copier.

* * * * *